United States Patent
Tang

(10) Patent No.: US 11,892,643 B2
(45) Date of Patent: Feb. 6, 2024

(54) AUGMENTED REALITY GLASSES

(71) Applicants: K-Tronics (Suzhou) Technology Co., Ltd., Jiangsu (CN); BOE TECHNOLOGY GROUP CO., LTD., Beijing (CN)

(72) Inventor: Baohua Tang, Beijing (CN)

(73) Assignees: K-Tronics (Suzhou) Technology Co., Ltd., Jiangsu (CN); BOE TECHNOLOGY GROUP CO., LTD., Beijing (CN)

( * ) Notice: Subject to any disclaimer, the term of this patent is extended or adjusted under 35 U.S.C. 154(b) by 711 days.

(21) Appl. No.: 17/042,141

(22) PCT Filed: Dec. 13, 2019

(86) PCT No.: PCT/CN2019/125266
§ 371 (c)(1),
(2) Date: Sep. 27, 2020

(87) PCT Pub. No.: WO2021/114254
PCT Pub. Date: Jun. 17, 2021

(65) Prior Publication Data
US 2023/0120469 A1   Apr. 20, 2023

(51) Int. Cl.
*G02B 27/01*   (2006.01)

(52) U.S. Cl.
CPC ..... *G02B 27/0176* (2013.01); *G02B 27/0172* (2013.01); *G02B 2027/0178* (2013.01)

(58) Field of Classification Search
CPC ............ G02B 27/0176; G02B 27/0172; G02B 2027/0178
See application file for complete search history.

(56) References Cited

U.S. PATENT DOCUMENTS

| 5,652,635 A * | 7/1997 | Kirschner | G02C 11/02 |
| | | | 351/52 |
| 2013/0188080 A1* | 7/2013 | Olsson | G06F 1/163 |
| | | | 381/151 |

(Continued)

FOREIGN PATENT DOCUMENTS

| CN | 107003523 A | 8/2017 |
| CN | 207133509 U | 3/2018 |

(Continued)

OTHER PUBLICATIONS

European Patent Office, EP19946241.7 Extended European Search Report, dated Nov. 7, 2022.

*Primary Examiner* — Jeffery A Brier
(74) *Attorney, Agent, or Firm* — HOUTTEMAN LAW LLC

(57) ABSTRACT

Provided are augmented reality glasses, including: a lens unit; two temple brackets connected to a first side and a second side of the lens unit, respectively, the first side and the second side being two opposite sides of the lens unit; at least one optical module configured to form a screen, each of which is connected to at least one optical module holder that each is in rotatable connection with one of the temple brackets, an axis of rotation of the rotatable connection is set along a direction from the first side toward the second side so that the optical module is movable between a first position in front of the lens unit and a second position deviating from the front of the lens unit.

13 Claims, 5 Drawing Sheets

(56) References Cited

U.S. PATENT DOCUMENTS

| | | | |
|---|---|---|---|
| 2013/0235331 A1* | 9/2013 | Heinrich | G02C 11/10 351/158 |
| 2016/0103325 A1* | 4/2016 | Mirza | H04N 23/54 351/137 |
| 2018/0031847 A1 | 2/2018 | Tatsuta et al. | |
| 2018/0173017 A1 | 6/2018 | Imagawa | |
| 2019/0113760 A1 | 4/2019 | Tatsuta | |
| 2021/0105552 A1* | 4/2021 | Khaleghimeybodi | G02B 27/0176 |

FOREIGN PATENT DOCUMENTS

| | | | |
|---|---|---|---|
| CN | 207650484 U | | 7/2018 |
| CN | 208141052 U | | 11/2018 |
| EP | 2302441 A1 | | 3/2011 |
| JP | 3090155 U | * | 9/2002 |
| WO | WO 2017004695 A1 | | 1/2017 |

* cited by examiner

AUGMENTED REALITY GLASSES

CROSS-REFERENCE TO RELATED APPLICATIONS

The application is a National Phase Application filed under 35 U.S.C. 371 as a national stage of PCT/CN2019/125266, filed on Dec. 13, 2019.

TECHNICAL FIELD

Embodiments of the present disclosure belong to the technical field of augmented display, and particularly relates to augmented reality glasses.

BACKGROUND

Augmented Reality (AR) is a technology that calculates positions and angles of a camera image in real time and adds corresponding images, videos, and 3D models.

Augmented reality technology may be used in AR glasses. A user wearing AR glasses can observe real scenery, while an optical system in the AR glasses can collect scenery images through the camera, identify and analyse corresponding targets in the scenery, and finally display contents related to the scenery.

SUMMARY

In a first aspect, an embodiment of the present disclosure provides augmented reality glasses, including:
  a lens unit;
  two temple brackets connected to a first side and a second side of the lens unit, respectively, the first side and the second side being two opposite sides of the lens unit;
  at least one optical module configured to form a screen, each of which is connected to at least one optical module holder that each is in rotatable connection with one of the temple brackets, an axis of rotation of the rotatable connection is set along a direction from the first side toward the second side so that the optical module is movable between a first position in front of the lens unit and a second position deviating from the front of the lens unit.

In some embodiments, at least one of the temple brackets includes: a first groove provided on a surface of the temple bracket facing the optical module holder; and a raised portion provided on a surface of the optical module holder facing the temple bracket, the raised portion extending into the first groove to enable the optical module holder to rotate relative to the temple bracket about an axis of rotation passing through the optical module holder and the temple bracket.

In some embodiments, at least one of the temple brackets further includes: a second groove provided on a surface of the temple bracket facing or away from the optical module holder, a side of the first groove being in communication with a side of the second groove, and a side of the raised portion facing the second groove including first ridges; and the augmented reality glasses further include: an adjusting member provided in the second groove, second ridges matched with the first ridges being provided on a side of the adjusting member closer to the raised portion; and at least one elastic member provided between the adjusting member and a sidewall of the second groove away from the raised portion, wherein when the first ridges and the corresponding second ridges slide relatively, the elastic member is compressed and deformed to apply a force pointing to the raised portion on the adjusting member.

In some embodiments, at least one adjusting blind hole is provided on a side of the adjusting member away from the raised portion, into which an end of the elastic member is inserted.

In some embodiments, each adjusting member corresponds to a plurality of elastic members.

In some embodiments, a limiting block is further provided on a surface of each raised portion facing a bottom of the first groove; the temple bracket further includes: a limiting hole provided on the bottom of the first groove, into which the limiting block is inserted, the limiting hole limiting movement of the limiting block within a preset range, so as to limit a maximum rotation angle of the optical module holder relative to the temple bracket.

In some embodiments, the augmented reality glasses further include: a first fastener configured to secure the adjusting member in the second groove.

In some embodiments, the first fastener includes: a pressing piece covering at least part of an opening of the second groove, so as to secure the adjusting member in the second groove; and a first fastening screw configured to secure the pressing piece on the temple bracket.

In some embodiments, at least one of the temple brackets includes first mounting through holes; the optical module holder includes second mounting through holes corresponding to the first mounting through holes one by one and in communication with the corresponding first mounting through holes; and the augmented reality glasses further include: rotation shafts corresponding to the first mounting through holes one by one and passing through the corresponding first mounting through holes and second mounting through holes so that the temple bracket and the optical module holder implement the rotatable connection.

In some embodiments, the augmented reality glasses further include: at least one second fastener configured to limit the rotation shaft in the first and second mounting through holes.

In some embodiments, each second fastener includes a first sub-fastener and a second sub-fastener, the first sub-fastener is provided on an outer side of the first mounting through hole away from the optical module holder, has a cross-sectional area greater than the first mounting through hole, and is fixedly connected to one end of the rotation shaft, while the second sub-fastener is provided on an outer side of the second mounting through hole away from the temple bracket, has a cross-sectional area greater than the second mounting through hole, and is fixedly connected to the other end of the rotation shaft.

In some embodiments, one optical module is provided and connected to one optical module holder, and the optical module holder is rotatably connected to one of the temple brackets.

In some embodiments, one optical module is provided and connected to two optical module holders, and the two optical module holders are rotatably connected to the two temple brackets, respectively.

In some embodiments, two optical modules are provided and each connected to one optical module holder, and the two optical module holders are rotatably connected to the two temple brackets, respectively.

In some embodiments, the lens unit is rotatably connected to the temple brackets.

BRIEF DESCRIPTION OF THE DRAWINGS

Accompanying drawings are provided for further understanding of embodiments of the present disclosure and constitute a part of the specification. Hereinafter, these drawings are intended to explain the embodiments of the present disclosure together with the following specific implementations, but should not be considered as a limitation to the embodiments of the present disclosure. In the drawings:

FIG. 7b is a schematic cross-sectional view taken along A-A of FIG. 7a;

Figure 1:
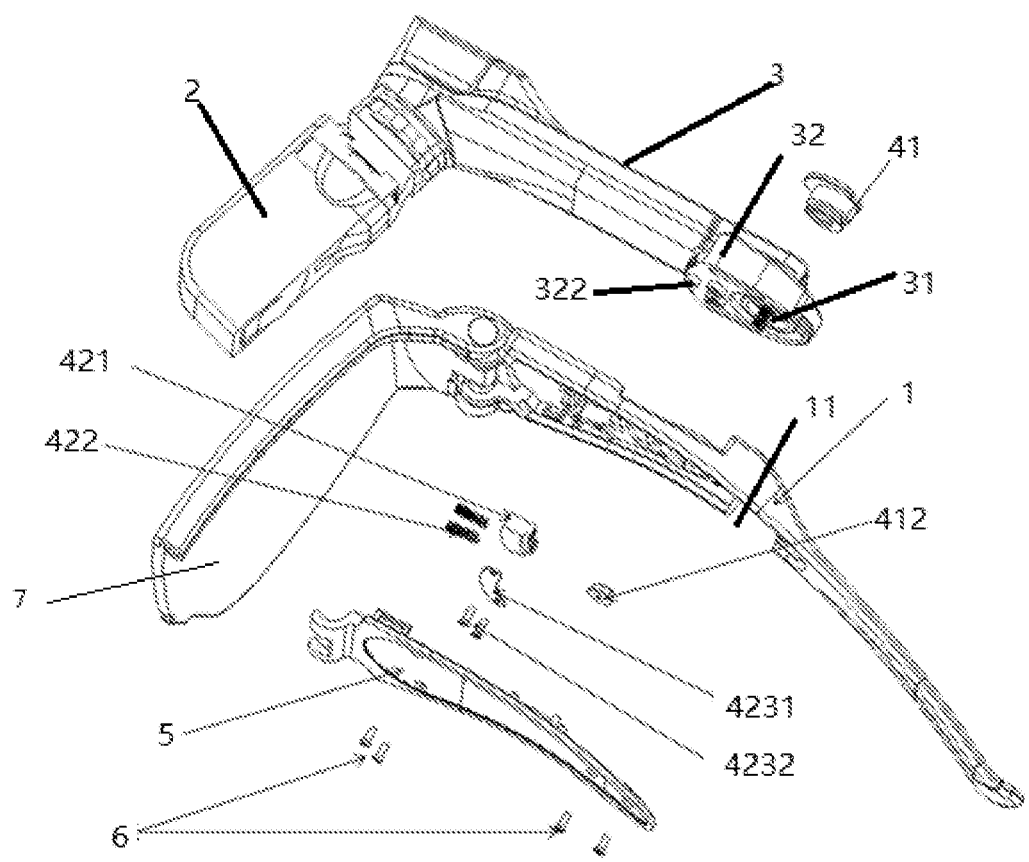
FIG. 1 is a partial structural exploded view of augmented reality glasses according to an embodiment of the present disclosure.

wherein the reference numbers are as follows: 1. temple bracket; 11. first mounting through hole; 12. second groove; 13. first groove; 14. limiting hole; 2. optical module; 3. optical module holder; 31. second mounting through hole; 32. raised portion; 321. first ridge; 322. limiting block; 41. rotation shaft; 412. second fastener; 421. adjusting member; 4211. second ridge; 4212. adjusting blind hole; 422. elastic member; 4231. pressing piece; 4232. first fastening screw; 5. housing; 6. fastening screw; 7. lens unit.

DETAILED DESCRIPTION OF THE EMBODIMENTS

To improve understanding of the technical solution in the embodiments of the present disclosure for those skilled in the art, the augmented reality glasses provided in the embodiments of the disclosure will be described below in detail in conjunction with the accompanying drawings.

Example embodiments will be described more sufficiently below with reference to the accompanying drawings, but which may be embodied in different forms and should not be construed as limited to the embodiments set forth in the disclosure. Rather, these embodiments are provided so that this disclosure will be thorough and complete, and will fully convey the scope of the disclosure to those skilled in the art.

As used in this disclosure, the term "and/or" includes any and all combinations of one or more of the associated listed items.

Terminology used in the disclosure is for the purpose of describing specific embodiments only and is not intended to limit the disclosure. As used in this disclosure, the singular forms "a," "an," and "the" are intended to include the plural forms as well, unless the context clearly indicates otherwise.

As used herein, the terms "comprise" and/or "consist of . . ." specify the presence of stated features, integers, steps, operations, elements, and/or components, but do not preclude the presence or addition of one or more other features, integers, steps, operations, elements, components, and/or groups thereof.

Embodiments described in the disclosure may be described with reference to plan and/or cross-sectional views in idealized representations of the present disclosure. Accordingly, the example illustrations may be modified in accordance with manufacturing techniques and/or tolerances.

The embodiments of the present disclosure are not limited to the embodiments shown in the drawings, but include modifications of configurations formed based on a manufacturing process. Thus, the regions illustrated in the figures have schematic properties, and the shapes of the regions shown in the figures illustrate specific shapes of regions of elements, but are not intended to be limiting.

Unless otherwise defined, all terms (including technical and scientific terms) used in the disclosure have the same meaning as commonly understood by one of ordinary skill in the art. It will be further understood that terms, such as those defined in commonly used dictionaries, should be interpreted as having a meaning that is consistent with their meaning in the context of the related art and the present disclosure, and will not be interpreted in an idealized or overly formal sense unless expressly so defined in the disclosure.

In the related art, a kind of augmented reality glasses using AR technology (such as AR glasses) mainly includes a lens unit, and an optical module configured to display a screen, and temple brackets configured to get the augmented reality glasses worn on a head of a user. The lens unit includes two "spectacle lenses", i.e., the "lens" portions of the glasses, which, along with the optical module, are secured on the temple brackets. When a user needs to use the augmented reality glasses, the two temple brackets are respectively "erected" on two ears of the user to get the augmented reality glasses worn on the head, that is, to position the lens unit and the optical module in front of eyes of the user; when the user does not need the augmented reality glasses any more, in order to prevent the optical module from affecting normal sight of the user, the augmented reality glasses need to be taken off from the head of the user. However, such repeated wearing and taking off of the augmented reality glasses brings inconvenience to the user, thereby affecting the user experience.

In a first aspect, referring to FIGS. 1 to 7b, an embodiment of the present disclosure provides augmented reality glasses (AR glasses), including:

a lens unit 7;

two temple brackets 1 connected to a first side and a second side of the lens unit 7, respectively, the first side and the second side being two opposite sides of the lens unit;

at least one optical module 2 configured to form a screen, each of which is connected to at least one optical module holder 3 that each is in rotatable connection with one of the temple brackets 1, an axis of rotation of the rotatable connection is set along a direction from the first side toward the second side so that the optical module 2 is movable between a first position in front of the lens unit 7 and a second position deviating from the front of the lens unit 7.

The lens unit 7 includes two "spectacle lenses", i.e., the "lens" portions of the glasses, which may form an integral structure, or may be connected by an intermediate structure such as a connector. At the same time, the lens unit 7 may further include a "nose pad" and other structures, which are not detailed herein.

That is, the opposite first and second sides of the lens unit 7 are each connected to one of the temple brackets 1, and by the two temple brackets 1 respectively "erected" on two ears of the user, the augmented reality glasses may be worn on the user's head, that is, to position the lens unit 7 in front of eyes of the user (the temple brackets 1 shown in FIGS. 1 to 4 may be considered to correspond to only one part of the glasses, while the other part may be symmetrically disposed with respect to the one part). When a user wears the augmented reality glasses, the left and right sides, i.e., the first and second sides, of the lens unit 7 are each connected to one of the temple brackets 1.

The optical module 2 may form a preset screen, where "form a screen" means making the preset screen able to be observed by the user's eyes in any method. Specifically speaking, the optical module 2 may directly display the preset screen, or project the preset screen onto the lens unit 7, or directly project the preset screen into the user's eyes, or the like. Therefore, wearing the augmented reality glasses, the user can observe a content displayed by the optical module 2; meanwhile, wearing the augmented reality glasses, the user can also observe at least part of external scenes through the lens unit 7. Therefore, the glasses of the embodiment are augmented reality glasses.

When referring to "one" optical module 2, it means an optical module 2 that forms an integral structure, but not necessary that one optical module 2 corresponds to only one eye. For example, the optical module 2 may include microdisplays, each of which can display a screen for one eye to watch. If the augmented reality glasses include only one microdisplay, obviously only one optical module 2 is provided, and thus the augmented reality glasses only enable one eye of the user to observe a screen; and when the augmented reality glasses includes two microdisplays, two eyes of the user are enabled to observe screens, respectively (including observing different screens to realize 3D display). The two microdisplays belong to the same optical module 2 if they are connected with each other, whereas if the two microdisplays are separated, they belong to two optical modules 2.

The optical module 2 is secured on the optical module holder 3, i.e. the optical module holder 3 is configured to secure the optical module 2. Further, the optical module holder 3 is rotatably connected to the temple bracket 1 and thus drives the optical module 2 to move, that is, the augmented reality glasses of this embodiment make the optical module 2 changeable in position relative to the temple bracket 1 (i.e., the lens unit 7 or user's eyes).

Figure 2:
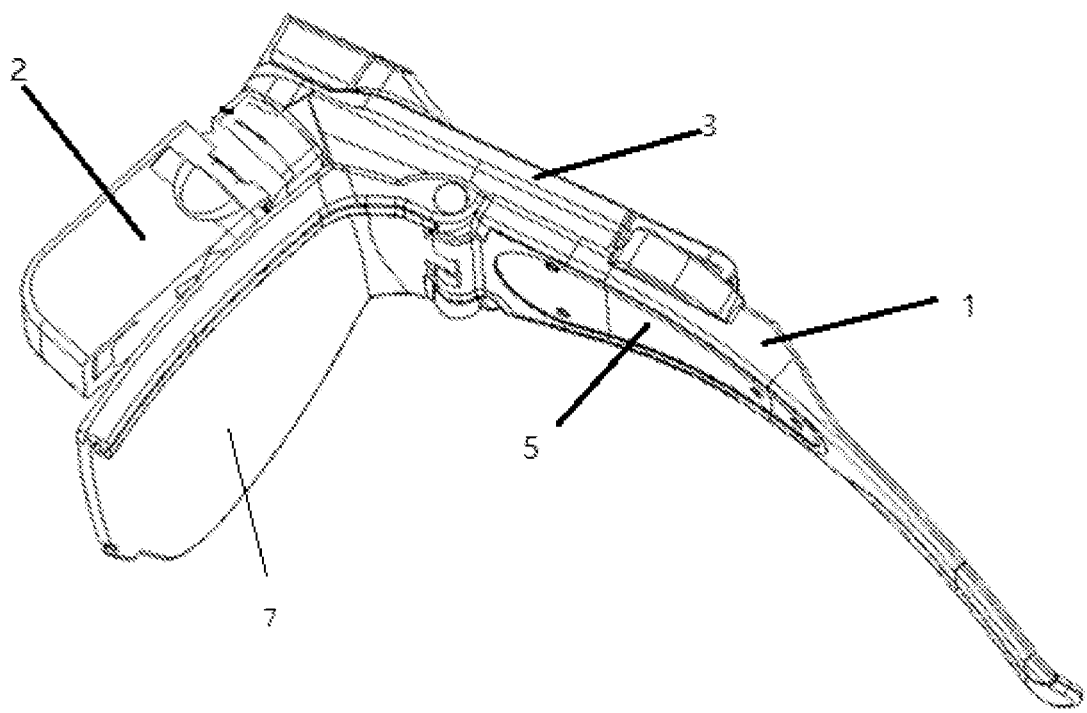
FIG. 2 is a schematic partial structural view of augmented reality glasses according to an embodiment of the present disclosure.

Referring to FIG. 2, the optical module holder 3 is provided at a side of the user's head and rotatable relative to the temple bracket 1. Since the axis of rotation for the rotatably connected optical module holder 3 and temple bracket 1 is disposed along a direction from the first side toward the second side (or a direction of a connecting line between the two lenses), and the temple bracket 1 has a certain length, when the two are rotated, the optical module 2 is moved up and down in front of the lens unit 7 (the user's eyes), that is, between a "first position" in direct front of the lens unit 7 and a "second position" above or below the direct front of the lens unit 7.

Obviously, when a user can observe a preset screen formed by the optical module 2, the optical module 2 is at least partially blocked in front of the lens unit 7 (i.e., in the "first position"). As a result, the optical module 2 will inevitably block at least part of the user's sight and thus affect the user's view of the real scenery. Therefore, in some related art, when the user does not need the display any more, the augmented reality glasses are required to be removed, which makes the user troublesome to operate.

Figure 6A:
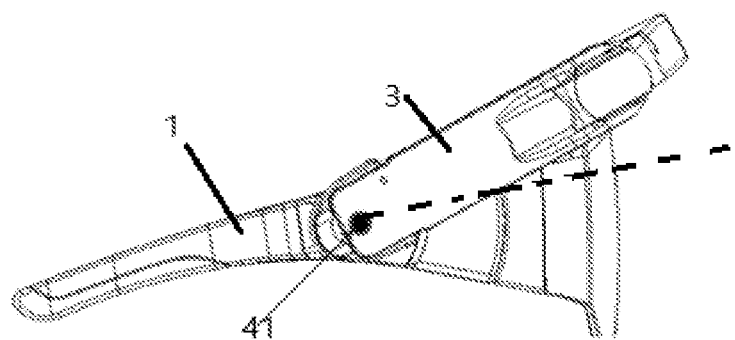
FIGS. 6a to 6c are schematic structural views illustrating angle adjustments of an optical module holder of augmented reality glasses according to an embodiment of the disclosure.
Figure 6B:
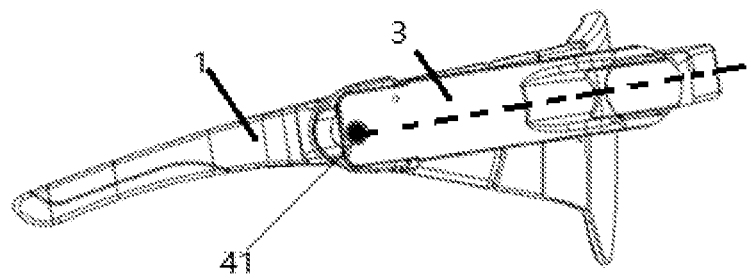
Figure 6C:
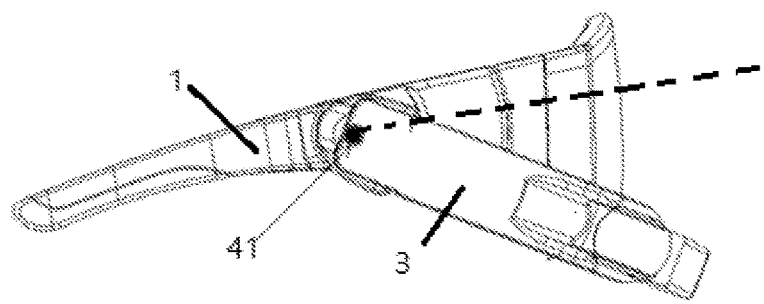
Figure 7A:
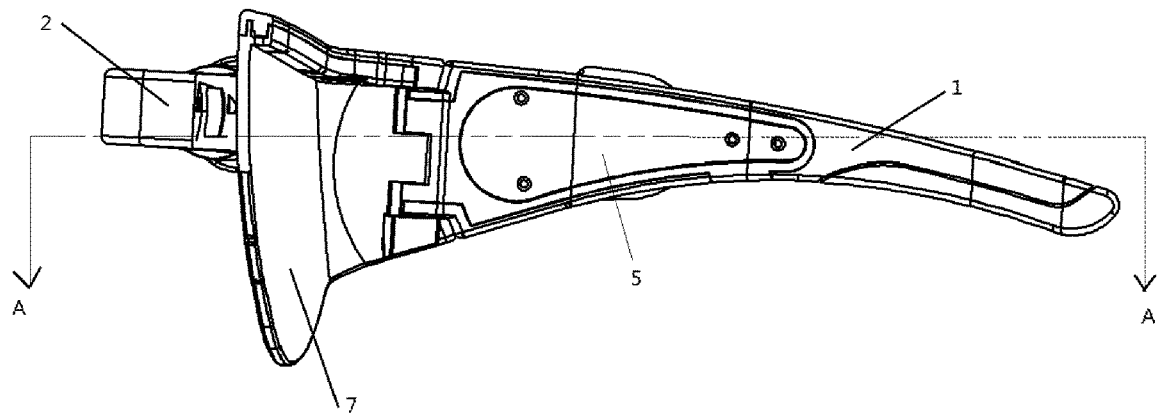
FIG. 7a is a schematic structural view of augmented reality glasses according to an embodiment of the present disclosure.
Figure 7B:
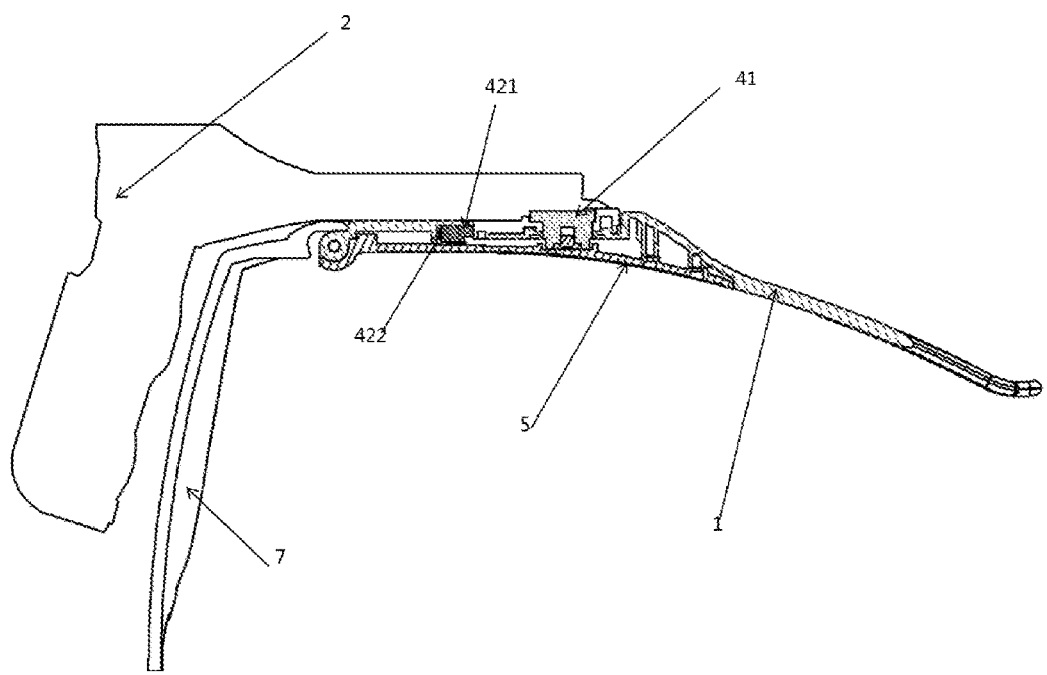

In the augmented reality glasses of the embodiment, the optical module 2 can realize the different positions of the optical module holder 3 shown in FIGS. 6*a* to 6*c*, and the dotted line in FIGS. 6*a* to 6*c* represents the viewing direction (i.e. front of the lens unit 7). Therefore, FIGS. 6*a* and 6*c* show the second position of the optical module 2, and FIG. 6*b* shows the first position of the optical module 2. The specific range of the first position may be adjusted within a certain range to adapt to different actual conditions.

In the augmented reality glasses of the embodiment, by means of adjusting the relative position between the temple bracket 1 and the optical module holder 3, the preset screen formed by the optical module 2 may be transmitted into the user's eyes when the temple brackets 1 are wore on the head by the user. Specifically, since the temple bracket 1 is movably connected to the optical module holder 3, when a user wears and needs to use the augmented reality glasses, the optical module 2 may be adjusted to a work position, that is, the first position, where the preset screen formed by the optical module 2 can be transmitted to the user's eyes so that the augmented reality glasses work normally; and when the user does not need the augmented reality glasses any more, the optical module 2 may be adjusted to a position where the optical module 2 does not block the user's sight, i.e., the second position, so that the user can normally observe external objects, avoiding the inconvenience to the user caused by repeatedly wearing and taking off the augmented reality glasses. Meanwhile, by adjusting the angle of the optical module 2, the optical module 2 can better adapt to the needs of different users and different situations, such as preventing colour distortion in the user's eyes due to reflection of a plating of the optical module 2, thereby improving the user experience.

In some embodiments, at least one of the temple brackets 1 includes:
  a first groove 13 provided on a surface of the temple bracket 1 facing the optical module holder 3; and
  a raised portion 32 provided on a surface of the optical module holder 3 facing the temple bracket 1, the raised portion 32 extending into the first groove 13 and rotatable around the axis of rotation relative to the temple bracket 1.

That is, the first groove 13 is provided on a side of the temple bracket 1, into which the corresponding raised portion 32 of the optical module holder 3 is rotatably inserted, to achieve a rotatable connection between the temple bracket 1 and the optical module holder 3.

In some embodiments, at least one of the temple brackets 1 further includes:
  a second groove 12 provided on a surface of the temple bracket 1 facing or away from the optical module holder 3, a side of the first groove 13 being in communication with a side of the second groove 12, and a side of the raised portion 32 facing the second groove 12 including first ridges 321;
  the augmented reality glasses further include:
  an adjusting member 421 (a rack insert) provided in the second groove 12, second ridges 4211 matched with the first ridges 321 being provided on a side of the adjusting member 421 closer to the raised portion 32; and
  at least one elastic member 422 provided between the adjusting member 421 and a sidewall of the second groove 12 away from the raised portion 32, wherein when the first ridges 321 and the corresponding second ridges 4211 slide relatively, the elastic member 422 is compressed and deformed to apply a force pointing to the raised portion 32 on the adjusting member 421.

That is, the second groove 12 is connected to a side of the first groove 13, and the adjusting member 421 is provided inside of the second groove 12. The opposite sides of the raised portion 32 and the adjusting member 421 are provided with matched first ridges 321 and second ridges 4211. The elastic member 422 is disposed between the adjusting member 421 and the sidewall of the second groove 12 away from the raised portion 32.

When the user applies a large force to slide the raised portion 32 and the adjusting member 421 relative to each other, since the adjusting member 421 is not rotatable relative to the temple bracket 1, the first ridges 321 of the raised portion 32, while being moved relative to the second ridges 4211 of the adjusting member 421, will reach a position where tips of the first ridges 321 and tips of the second ridges 4211 are opposite to each other. At this time, the adjusting member 421 is moved in a direction toward the elastic member 422 while the elastic member 422 is compressed so that the elastic member 422 may apply a force pointing to the raised portion 32 on the adjusting member 421. Meanwhile, after the first ridges 321 and the second ridges 4211 are rotated through the position where the tips are opposite, the adjusting member 421 is pushed to engage the first ridges 321 with the second ridges 4211 at a next position, thereby ensuring that the temple bracket 1 and the optical module holder 3 cannot be rotated relative to each other without a force.

When the first ridges 321 and the second ridges 4211 are engaged with each other, the elastic member 422 may or may not apply a force to the adjusting member 421.

The opening of the second groove 12 may be on any side of the temple bracket 1 to install the adjusting member 421, and it is preferable that the opening of the second groove 12 is provided on a different side of the temple bracket 1 from the first groove 13 so as to prevent mutual influence of the raised portion 32 and the adjusting member 421 during installation of the two. For example, if the optical module holder 3 is located outside of the temple bracket 1, the opening of the first groove 13 should also be provided outside the temple bracket 1, whereas the opening of the second groove may be provided inside the temple bracket 1.

In some embodiments, at least one adjusting blind hole 4212 is provided on a side of the adjusting member 421 away from the raised portion 32, into which an end of the elastic member 422 is inserted.

That is, the adjusting blind hole 4212 is provided on a side of the adjusting member 421 and configured to limit a position of the elastic member 422, so as to prevent positional changes of the elastic member 422 caused by rotation of the adjusting member 421, and thus ensure the function of the elastic member 422.

The adjusting blind hole 4212 of the adjusting member 421 can reinforce arrangement of the elastic member 422, leading to a simple structure and an easy manufacturing process while ensuring an accurate force application direction of the elastic member 422.

Specifically, the elastic member 422 is a spring. A deformation direction of the spring is parallel to a direction in which the corresponding adjusting member 421 points to the corresponding raised portion 32.

It should be noted that the elastic member 422 is not limited to a spring, and may be other types of elastic members 422, which are not listed one by one here.

In some embodiments, each adjusting member 421 corresponds to a plurality of elastic members 422.

Specifically, each adjusting member 421 may include a plurality of (e.g., two) adjusting blind holes 4212, and each adjusting member 421 corresponds to a plurality of elastic members 422 that correspond to the adjusting blind holes 4212 one by one.

Figure 5A:
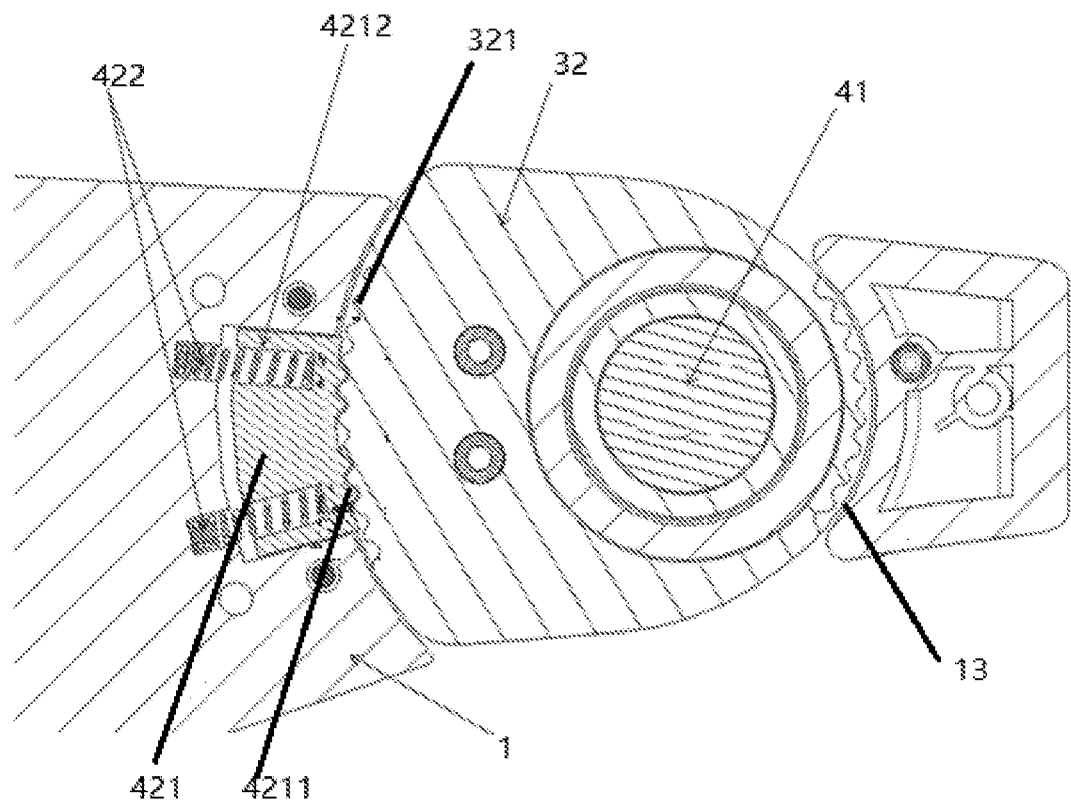
FIGS. 5a and 5b are schematic structural views illustrating a relative movement process of a raised portion and an adjusting member of augmented reality glasses according to an embodiment of the present disclosure.
Figure 5B:
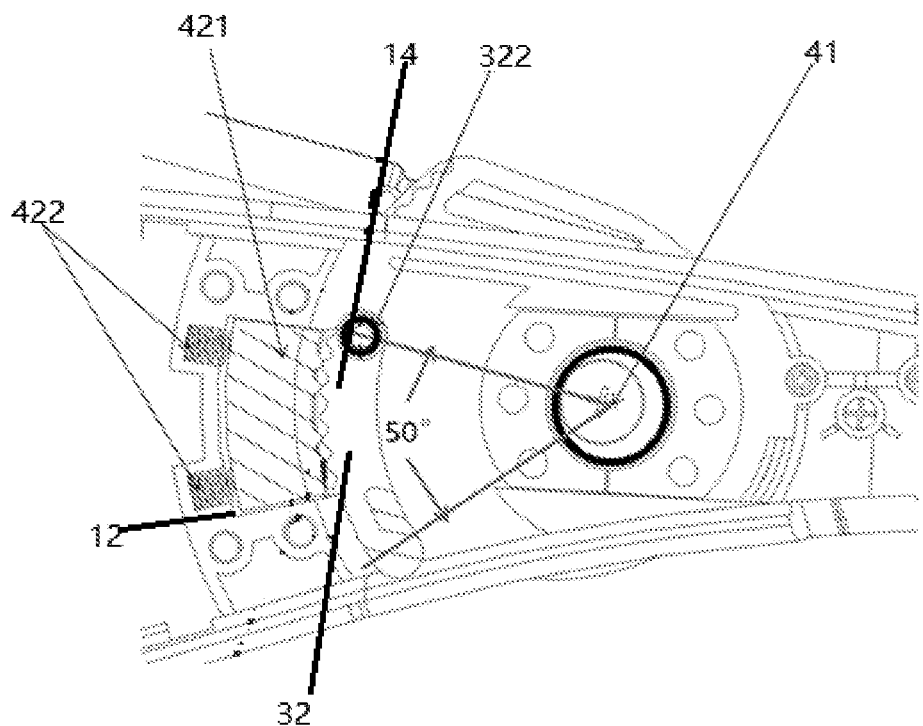

As shown in FIGS. 5a and 5b, when two adjusting blind holes 4212 and two elastic members 422 are provided, the acting force of the elastic members 422 on the adjusting member 421 can be ensured to be as uniform as possible while ensuring the simple structure of the angle adjusting structure, so as to guarantee the optimal performance of the elastic members 422 and thus the optimal performance of the angle adjusting structure.

In some embodiments, a limiting block 322 is further provided on a surface of each raised portion 32 facing a bottom of the first groove 13;
the temple bracket 1 further includes: a limiting hole 14 provided on the bottom of the first groove 13, into which the limiting block 322 is inserted, the limiting hole 14 limiting movement of the limiting block 322 within a preset range, so as to limit a maximum rotation angle of the optical module holder 3 relative to the temple bracket 1.

Obviously, when the optical module 2 is not in use, since the rotation of the optical module holder 3 relative to the temple bracket 1 is achieved by simply removing the optical module 2 out of sight of the user without rotating the optical module holder 3 over an excessively large range, the rotation angle of the optical module holder 3 relative to the temple bracket 1 is limited by the cooperation of the limiting block 322 and the limiting hole 14, as shown in FIG. 5b.

Specifically, the limiting hole 14 (e.g., the arcuate hole in FIG. 5b) may be provided on the bottom of the first groove 13, into which the limiting block 322 of the raised portion 32 is inserted so that the limiting block 322 may slide in the hole but cannot go beyond the limiting hole 14. Therefore, the position, shape and size of the limiting hole 14 define a movement range of the limiting block 322, that is, define limit positions of the optical module holder 3, i.e., limit the maximum rotation angle of the optical module holder 3 relative to the temple bracket 1. For example, for the movement range of the limiting block 322, a reference may be made to FIG. 5b.

Specifically, the maximum rotation angle of the optical module holder 3 relative to the temple bracket 1 is 45°-55°.

Specifically, as shown in FIG. 5b, it is preferable that the relative rotation angle between the optical module holder 3 and the temple brackets 1 is 50° at the maximum. In particular, FIGS. 6a to 6c show the relative rotation between the optical module holder 3 and the temple bracket 1, wherein the rotation range from FIG. 6a to FIG. 6c is the maximum rotation angle of the optical module holder 3 relative to the temple bracket 1.

In some embodiments, the augmented reality glasses of the embodiment further include: a first fastener configured to secure the adjusting member 421 in the second groove 12.

The first fastener includes: a pressing piece 4231 covering at least part of an opening of the second groove 12, so as to secure the adjusting member 421 in the second groove 12; and a first fastening screw 4232 configured to secure the pressing piece 4231 on the temple bracket 1.

That is to say, the adjusting member 421 is prevented from falling out of the second groove 12 by securing the adjusting member 421 with the first fastener, which can guarantee the stability of the adjusting member 421 in the second groove 12, ensure the performance of angle adjusting structure, and thus prolong the life of the augmented reality glasses.

Specifically, the pressing piece 4231 is equivalent to a lid for the opening of the second groove 12, and the first fastening screw 4232 then secures the pressing piece 4231 on the temple bracket 1 so that the adjusting member 421 is firmly held in the second groove 12 by the first fastener.

The first fastener with such simple structure is easy in the manufacturing process and easy to realize, and thus can reduce the manufacturing cost.

In some embodiments, at least one of the temple brackets 1 includes first mounting through holes 11;
the optical module holder 3 includes second mounting through holes 31 corresponding to the first mounting through holes 11 one by one and in communication with the corresponding first mounting through holes 11; and
the augmented reality glasses further include:
rotation shafts 41 corresponding to the first mounting through holes 11 one by one and passing through the corresponding first mounting through holes 11 and second mounting through holes 31 so that the temple bracket 1 and the optical module holder 3 implement the rotatable connection.

That is, the temple bracket 1 and the optical module holder 3 are respectively provided with the first mounting through holes 11 and the second mounting through holes 31, while the rotation shaft 41 passes through both the second mounting through holes 31 and the first mounting through holes 11 so that the optical module holder 3 is moved relative to the temple bracket 1 about the axis of the rotation shaft 41 (both the temple bracket 1 and the optical module holder 3 are rotatable about the rotation shaft 41).

Figure 4:
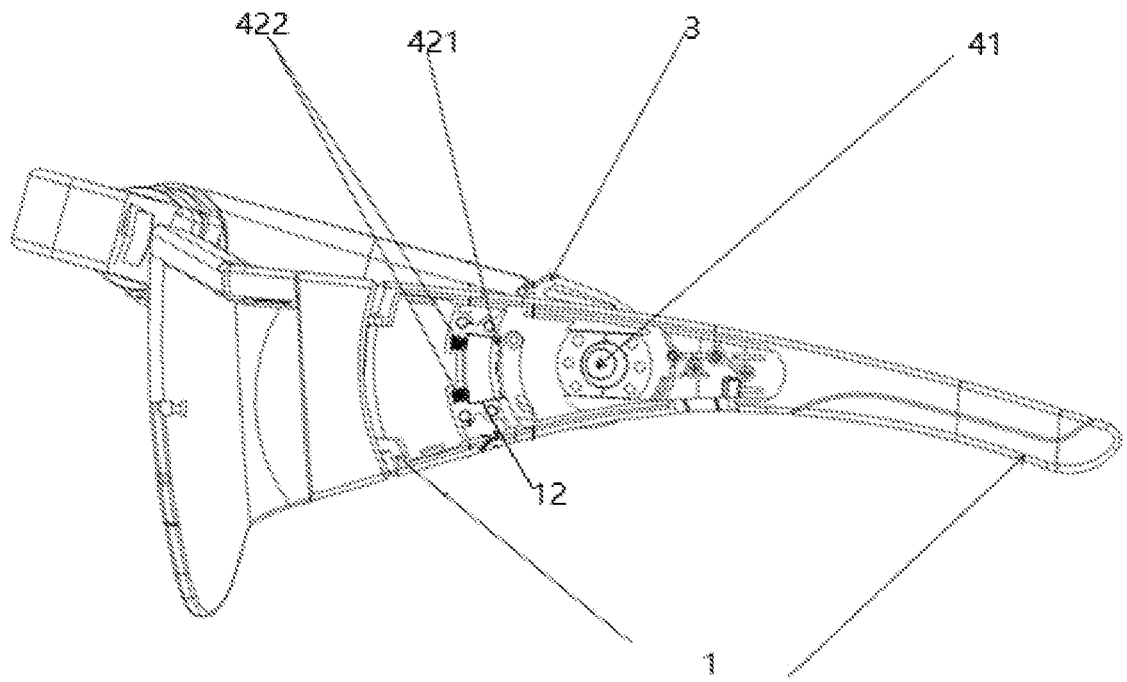
FIG. 4 is a schematic partial structural view of augmented reality glasses according to an embodiment of the present disclosure.

Referring to FIG. 4, when the optical module holder 3 is provided with the raised portion 32 and the temple bracket 1 is provided with the first groove 13, the augmented reality glasses may also have the rotation shaft 41, in which case the first mounting through holes 11 are provided at the bottom of the first groove 13 and the rotation shaft 41 rotatably connects the temple bracket 1 and the optical module holder 3 by passing through the raised portion 32 and the second mounting through holes 31.

In some embodiments, the augmented reality glasses further include: at least one second fastener 412 configured to limit the rotation shaft 41 in the first and second mounting through holes 11 and 31.

Specifically, each second fastener 412 includes a first sub-fastener and a second sub-fastener, the first sub-fastener is provided on an outer side of the first mounting through hole 11 away from the optical module holder 3, has a cross-sectional area greater than the first mounting through hole 11, and is fixedly connected to one end of the rotation shaft 41, while the second sub-fastener is provided on an outer side of the second mounting through hole 31 away from the temple bracket 1, has a cross-sectional area greater than the second mounting through hole 31, and is fixedly connected to the other end of the rotation shaft 41.

Since the rotation shaft 41 is rotatable relative to both the temple bracket 1 and the optical module holder 3, the second fastener 412 is required to limit the rotation shaft 41 in the first and second mounting through holes 11 and 31. Specifically, the second fastener 412 may be "caps" (i.e., the first sub-fastener and the second sub-fastener) connected to two ends of the rotation shaft 41, the first sub-fastener has a cross-sectional area greater than the first mounting through hole 11, and the second sub-fastener has a cross-sectional area greater than the second mounting through hole 31, and thus the rotation shaft 41 will not fall out of the first and second mounting through holes 11 and 31, thereby limiting the rotation shaft 41.

Obviously, if only one of the optical module holder 3 and the temple bracket 1 has a hole and the other is fixed to the rotation shaft 41, the rotation shaft 41 may be inserted into the one with the hole to realize rotation. It should be noted that the structure of the rotation shaft and the second fastener 412 may include other suitable structures, which are not listed one by one here.

In some embodiments, one optical module 2 is provided and connected to one optical module holder 3, and the optical module holder 3 is rotatably connected to one of the temple brackets 1.

Figure 3:
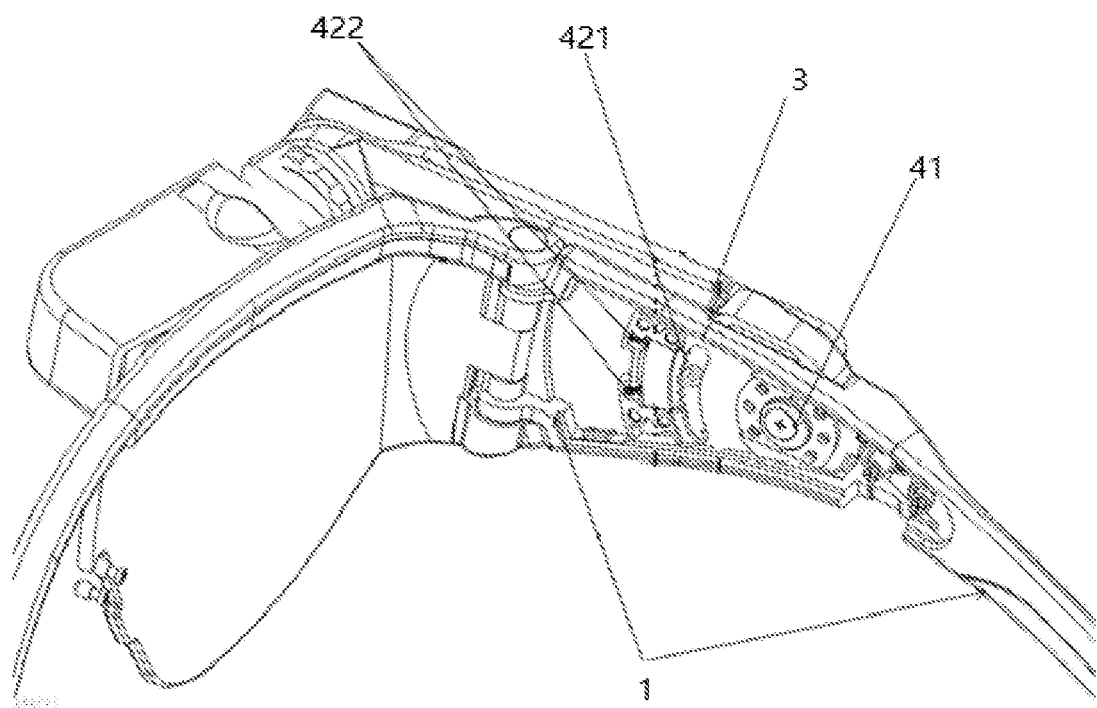
FIG. 3 is a schematic partial structural view of augmented reality glasses according to an embodiment of the present disclosure.

Referring to FIG. 3, that is, the optical module 2 may be connected to one of the temple brackets 1 via only one optical module holder 3, so as to simplify the structure of the product. Obviously, as mentioned above, at this time, the one optical module 2 may be used to provide a screen to only one eye or provide screens to both eyes of the user.

In some embodiments, one optical module 2 is provided and connected to two optical module holders 3, and the two optical module holders 3 are rotatably connected to the two temple brackets 1, respectively.

In this case, each of the two sides of the optical module 2 may be connected to one temple bracket 1 via one optical module holder 3 to ensure a more stable connection. Obviously, as mentioned above, at this time, the one optical module 2 may be used to provide a screen to only one eye or provide screens to both eyes of the user.

In some embodiments, two optical modules 2 are provided and connected to one optical module holder 3, respectively, and the two optical module holders 3 are rotatably connected to the two temple brackets 1, respectively.

In this case, the two optical modules 2 may be connected to the two temple brackets 1 via the respective optical module holders 3, respectively, so that the two can be moved independently relative to each other and become more flexible and free. Obviously, at this time, the two optical modules 2 may be used to provide screens to both eyes of the user.

In some embodiments, the lens unit 7 is rotatably connected to the temple bracket 1.

The lens unit 7 rotatably connected to the temple bracket 1 may specifically refer to being rotatable about an axis substantially parallel to a plane of the lens unit 7 so that the temple bracket 1 may be "folded" onto a back of the lens unit 7, or "extended" out of the back of the lens unit 7, thereby housing the augmented reality glasses and making the augmented reality glasses portable.

In addition, the augmented reality glasses of the embodiment further include:
a housing 5 provided on a surface of the optical module holder 3 away from the temple bracket 1, for covering the rotation shaft 41, the angle fixing structure, and the like.

That is to say, the housing 5 covers the rotation shaft 41, the angle fixing structure, and other mechanisms so that not only stability of the augmented reality glasses can be ensured, but also outlook of the augmented reality glasses can be improved.

It should be noted that the housing 5 may be secured by the fastening screw 6 on the temple brackets 1 or by any other suitable securing manner, which are not listed one by one here.

The augmented reality glasses of the embodiment are specifically mounted as follows:

At S11, the adjusting member 421 is mounted in the second groove 12 of the temple bracket 1.

At S21, a spring is installed in the adjusting blind hole 4212 of the adjusting member 421.

At S31, the pressing piece 4231 is disposed to cover at least a part of the second groove 12, and the pressing piece 4231 is secured to the temple bracket 1 with the first fastening screw 4232.

At S41, the raised portion 32 of the optical module holder 3 is mounted into the first groove 13 of the temple bracket 1 in communication, and the first ridges 321 of the raised portion 32 are arranged to be engaged with the second ridges 4211 of the adjusting member 421, while the first mounting through holes 11 are arranged to correspond to the second mounting through holes 31.

At S51, the rotation shaft is disposed to pass through the first and second mounting through holes 11 and 31 and secured by the second fastener 412.

At S61, the housing 5 is placed on the surface of the optical module holder 3 to cover the rotation shaft 41 and other mechanisms, and is disposed on a surface of the optical module holder 3 away from the temple bracket 1.

The present disclosure has disclosed example embodiments, and although specific terms are employed, they are used and should be interpreted in a generic and descriptive sense only and not for purposes of limitation. In some instances, features, characteristics and/or elements described in connection with a particular embodiment may be used alone or in combination with features, characteristics and/or elements described in connection with other embodiments, unless expressly stated otherwise, as would be apparent to one skilled in the art. It will, therefore, be understood by those skilled in the art that various changes in form and details may be made therein without departing from the scope of the disclosure as set forth in the appended claims.

What is claimed is:

1. Augmented reality glasses, comprising:
    a lens unit;
    two temple brackets connected to a first side and a second side of the lens unit, respectively, the first side and the second side being two opposite sides of the lens unit;
    at least one optical module, each of which is connected to at least one optical module holder that each is in rotatable connection with one of the temple brackets, an axis of rotation of the rotatable connection is set along a direction from the first side toward the second side so that the optical module is movable between a first position in front of the lens unit and a second position deviating from the front of the lens unit,
    wherein at least one of the temple brackets further comprises:
    a second groove provided on a surface of the temple bracket facing or away from the optical module holder;
    the augmented reality glasses further comprise:
    an adjusting member provided in the second groove; and
    a first fastener securing the adjusting member in the second groove,
    wherein the first fastener comprises:
    a pressing piece covering at least part of an opening of the second groove, so as to secure the adjusting member in the second groove; and
    a first fastening screw securing the pressing piece on the temple bracket.

2. Augmented reality glasses according to claim 1, wherein at least one of the temple brackets further comprises:
    a first groove provided on a surface of the temple bracket facing the optical module holder, a side of the first groove being in communication with a side of the second groove; and
    a raised portion provided on a surface of the optical module holder facing the temple bracket, the raised portion extending into the first groove to enable the optical module holder to rotate relative to the temple bracket about an axis of rotation passing through the optical module holder and the temple bracket.

3. Augmented reality glasses according to claim 2, wherein
    a side of the raised portion facing the second groove comprises first ridges;
    second ridges matched with the first ridges are provided on a side of the adjusting member closer to the raised portion; and
    the augmented reality glasses further comprise at least one elastic member provided between the adjusting member and a sidewall of the second groove away from the raised portion, wherein when the first ridges and the corresponding second ridges slide relatively, the elastic member is compressed and deformed to apply a force pointing to the raised portion on the adjusting member.

4. Augmented reality glasses according to claim 3, wherein at least one adjusting blind hole is provided on a side of the adjusting member away from the raised portion, into which an end of the elastic member is inserted.

5. Augmented reality glasses according to claim 3, wherein each adjusting member corresponds to a plurality of elastic members.

6. Augmented reality glasses according to claim 3, wherein a limiting block is further provided on a surface of each raised portion facing a bottom of the first groove;
    the temple bracket further comprises: a limiting hole provided on the bottom of the first groove, into which the limiting block is inserted, the limiting hole limiting movement of the limiting block within a preset range, so as to limit a maximum rotation angle of the optical module holder relative to the temple bracket.

7. Augmented reality glasses according to claim 1, wherein
    at least one of the temple brackets comprises first mounting through holes;
    the optical module holder comprises second mounting through holes corresponding to the first mounting through holes one by one and in communication with the corresponding first mounting through holes; and
    the augmented reality glasses further comprise:
    rotation shafts corresponding to the first mounting through holes one by one and passing through the corresponding first mounting through holes and second mounting through holes so that the temple bracket and the optical module holder implement the rotatable connection.

8. Augmented reality glasses according to claim 7, further comprising:
    at least one second fastener limiting the rotation shaft in the first and second mounting through holes.

9. Augmented reality glasses according to claim 8, wherein each second fastener comprises a first sub-fastener and a second sub-fastener, the first sub-fastener is provided on an outer side of the first mounting through hole away from the optical module holder, has a cross-sectional area greater than the first mounting through hole, and is fixedly connected to one end of the rotation shaft, while the second sub-fastener is provided on an outer side of the second mounting through hole away from the temple bracket, has a cross-sectional area greater than the second mounting through hole, and is fixedly connected to the other end of the rotation shaft.

10. Augmented reality glasses according to claim 1, wherein one optical module is provided and connected to one optical module holder, and the optical module holder is rotatably connected to one of the temple brackets.

11. Augmented reality glasses according to claim 1, wherein one optical module is provided and connected to two optical module holders, and the two optical module holders are rotatably connected to the two temple brackets, respectively.

12. Augmented reality glasses according to claim 1, wherein two optical modules are provided and each connected to one optical module holder, and the two optical module holders are rotatably connected to the two temple brackets, respectively.

13. Augmented reality glasses according to claim 1, wherein the lens unit is rotatably connected to the temple brackets.

\* \* \* \* \*